United States Patent [19]
Kirk

[11] Patent Number: 6,109,637
[45] Date of Patent: Aug. 29, 2000

[54] BICYCLE FRAME WITH SELF-DAMPED SPRING ACTION SEAT STAYS

[75] Inventor: David E. Kirk, Gansevoort, N.Y.

[73] Assignee: Great American Bicycle Co., LLC, South Glens Falls, N.Y.

[21] Appl. No.: 09/058,287

[22] Filed: Apr. 10, 1998

[51] Int. Cl.[7] .................................................... B62K 3/02
[52] U.S. Cl. ........................................ 280/284; 267/153
[58] Field of Search ........................... 267/153; 280/283, 280/284, 285, 288

[56] References Cited

U.S. PATENT DOCUMENTS

| | | |
|---|---|---|
| 392,523 | 11/1888 | Owen . |
| 1,407,218 | 2/1922 | Previtali ................................. 280/284 |
| 1,412,012 | 4/1922 | Bruno ..................................... 280/284 |
| 1,745,963 | 2/1930 | Trouche ................................. 280/283 |
| 3,459,441 | 8/1969 | Hornsby ................................. 280/276 |
| 3,877,539 | 4/1975 | Tilkens . |
| 3,942,821 | 3/1976 | Bock . |
| 3,982,770 | 9/1976 | Satoh et al. . |
| 4,322,088 | 3/1982 | Miyakoshi et al. . |
| 4,378,857 | 4/1983 | Andersson . |
| 4,505,492 | 3/1985 | Tsunoda . |
| 4,679,811 | 7/1987 | Shuler . |
| 4,830,391 | 5/1989 | Silk . |
| 5,217,241 | 6/1993 | Girvin . |
| 5,244,224 | 9/1993 | Busby . |
| 5,269,552 | 12/1993 | Yelverton . |
| 5,295,702 | 3/1994 | Buell . |
| 5,332,246 | 7/1994 | Buell ..................................... 280/284 |
| 5,355,165 | 10/1994 | Kulhawik et al. . |
| 5,370,411 | 12/1994 | Takamiya et al. ..................... 280/284 |

FOREIGN PATENT DOCUMENTS

| | | |
|---|---|---|
| 801885 | 1/1951 | Germany . |
| 41 23 643 A1 | 6/1992 | Germany . |
| 425968 | 10/1947 | Italy . |
| 435511 | 5/1948 | Italy . |
| 446263 | 3/1949 | Italy . |
| 453595 | 12/1949 | Italy . |
| 293941 | 7/1928 | United Kingdom . |

OTHER PUBLICATIONS

"Different by Design", Bicycle Guide, Aug., 1988, pp. 45–48.

RSTUSA Advertisements for Downhill, Cross Country, and Sport Suspension Forks, and Rear Suspension Springs; 1998.

Yoed's Bike Guide, Cannodale, Trek, and Softride listings; 1998.

Air Bunz Bicycle Air Saddle advertisement; 1998.

*Primary Examiner*—Paul N. Dickson
*Assistant Examiner*—Avraham H. Lerner
*Attorney, Agent, or Firm*—Nixon & Vanderhye P.C.

[57] ABSTRACT

A bicycle frame uses an existing frame member—a seat stay—as a spring, and absorbs high frequency, low amplitude vibration with effective damping. The spring force constant can be adjusted for rider weight, riding style, road or terrain conditions, or the like, and the system is lightweight. Each seat stay is connected at a top end to the seat tube, and pivotally connected at the bottom end to the rear drop out, and has a circular arcuate curvature adjacent the bottom end with a radius of between about 11–16 inches and subtending an angle of between about 20–60 degrees. A damping/spring constant increasing element, comprising a metal strip bonded to elastomeric material (such as silicone) having a durometer between about 20–70 Shore A, is bolted to the seat stay convex arcuate portion, and can be replaced with a unit having a different durometer.

14 Claims, 3 Drawing Sheets

BICYCLE FRAME WITH SELF-DAMPED SPRING ACTION SEAT STAYS

BACKGROUND AND SUMMARY OF THE INVENTION

Bicycles are subjected to significant vibration when the rear wheels engage bumps, depressions, or other uneven road or terrain conditions, which can result in rider discomfort, reduced speed, or even safety concerns. While systems are known for providing coil spring shock absorbers, or the like, for the rear portions of bicycle frames, these structures are expensive, and add a significant amount of weight to the bicycle, both of which are undesirable. Therefore it is desirable to be able to provide effective absorption of high frequency, low amplitude vibration in a relatively inexpensive manner that does not add a significant amount of weight to a bicycle frame.

According to the present invention a bicycle frame is provided which can absorb high frequency, low amplitude vibration and uses an existing frame member (namely the seat stays) as a spring for that purpose. Effective damping is also provided for the spring, and the structures providing the spring and damping results are lightweight and relatively inexpensive. Also the components according to the invention allow for ready adjustment of the spring constant and damping effect to accommodate different rider weight, riding style, road or terrain conditions, and other factors.

According to one aspect of the present invention a bicycle frame is provided comprising, as is conventional, a downtube, a seat tube, a cross bar, a fork, a head tube, a pair of chain stays, a rear drop-out, and a pair of seat stays, the chain stays operatively connected to the drop-out and to the seat tube, the cross bar operatively connected between the seat tube and the head tube, the downtube operatively connected between the seat tube and the head tube, and the fork operatively connected to the head tube. The seat stays, which are unique according to the invention, have a first end operatively connected to the seat tube, and a second end operatively connected to the rear drop out (as is conventional per se), with each of the seat stays also each comprising an arcuate portion thereof closer to the second end than the first end, and convex with respect to the chain stays. The seat stays are curved, positioned, and dimensioned so as to act as a spring if the drop out of the frame is subjected to bump forces (which it will be during normal operation).

Each of the seat stays may have a substantially circular arcuate portion subtending an angle of about 20–60 degrees, preferably about 40–50 degrees (e.g. about 45 degrees), and having a radius of between about 11–16 inches (preferably about 12–14 inches, e.g. a little more than 13 inches). The second end of each of the seat stays is preferably pivotally connected (in any conventional manner, such as with a pivot pin) to the rear drop out for pivotal movement about an axis substantially transverse to the dimension of elongation of the chain stays (that is parallel to the axis of rotation of the rear wheel).

The bicycle frame according to the invention further comprises means for substantially simultaneously increasing the spring constant of at least one of the seat stays (preferably both) while damping spring action thereof, when the rear drop out is subjected to bump forces. The simultaneous means may comprise a shock absorber mounted between the seat stays and other frame components, such as the seat tube, chain stays, or the like, with the shock absorber having any conventional configuration. However preferably the simultaneous means comprises an elastomeric material connected between the seat stay at the convex arcuate portion thereof, and a non-elastomeric material (but preferably flexible) support, such as a strip of metal (such as steel, preferably stainless steel). The strip of metal may be bolted to the seat stay for secure attachment but ready removal, the bolts passing through openings in the metal support and the elastomeric material. When the metal support is readily releasably connected to the seat stay, another simultaneous means, with a different effective damping and spring constant, may be readily substituted therefor in order to achieve the adjustability objectives of the invention.

The elastomeric material preferably comprises silicone, and preferably has a durometer between about 20–70 Shore A. Also the elastomeric material preferably has an arcuate surface which engages the seat stay and corresponds to the generally circular configuration of the seat stay. The seat stay may be tapered, and the elastomeric material surface that engages the seat stay will then have a taper and configuration corresponding to that of the seat stay. Threaded inserts may be provided within the seat stay for receipt of the bolts for connecting the simultaneous means to the seat stay.

Preferably the elastomeric material is bonded to the metal strip support, and different such damping and spring force constant-increasing elements may be provided for ready substitution to adjust spring constant and damping effect. When the rider hits a bump, the bump force pushes up on the rear wheel, causing the seat stay to flex and tighten its curve. As the curve tightens it compresses the elastomeric material (silicone) between the seat stay and the metal support. The elastomeric material resists compression and increases the spring rate of the seat stay while simultaneously providing damping to the entire spring system.

According to another aspect of the present invention a bicycle frame is provided comprising as conventional components: a downtube, a seat tube, a cross bar, a fork, a head tube, a pair of chain stays, a rear drop-out, and a pair of seat stays, the chain stays operatively connected to the drop-out and to the seat tube, the cross bar operatively connected between the seat tube and the head tube, the downtube operatively connected between the seat tube and the head tube, and the fork operatively connected to the head tube. The seat stays each have a first end operatively connected to the seat tube, and a second end operatively pivotally connected to the rear drop out for pivotal movement about an axis substantially perpendicular to the dimension of elongation of the chain stays (substantially parallel to the rear wheel axis of rotation), and the frame further comprises a combination damping and spring force-providing element mounted to each of the seat stays for providing a spring force resisting pivotal movement of the seat stays, and providing damping thereof.

The combination element preferably comprises an elastomeric material (such as silicone having a durometer between about 20–70 Shore A) connected between the seat stay at a portion thereof facing the chain stay, and a non-elastic material support (such as a strip of metal, such as stainless steel). Preferably the non-elastomeric material support is releasably connected to the seat stay so that another combination element with a different effective damping and spring constant may be readily substituted therefor.

The invention also relates to a vibration damping and spring force-providing set of a plurality of elements for use with a bicycle frame, per se. Each of the elements comprises an elastomeric material portion having a concavely curved first surface, and a substantially planar second surface, opposite the first surface, and a plurality of through extending openings passing through the first and second surfaces for receiving fasteners therein; and a flexible metal strip contacting the second surface and having openings aligned with the openings in the elastomeric material portion. Each of the elastomeric material portions preferably have a durometer between about 20–70 Shore A, and each elastomeric material portion has a durometer at least about 5 (e.g. at least about 10) Shore A units different than the other elastomeric portions of the other elements of the set. Preferably the elastomeric material portions are bonded to the metal strip, but if desired the elastomeric material components may be separate and the same metal strip may be used to hold different durometer elements in place. For example a set may comprise one element having a 25 Shore A durometer elastomeric material portion, with others having durometers of 40, 55, and 65.

It is the primary object of the present invention to provide a bicycle frame and associated components for effectively, yet in a relatively inexpensive manner and without adding a large amount of weight to the bicycle frame, absorb high frequency and low amplitude vibration during normal use of the frame. This and other objects of the invention will become clear from an inspection of the detailed description of the invention and from the appended claims.

DETAILED DESCRIPTION OF THE DRAWINGS

Figure 1:
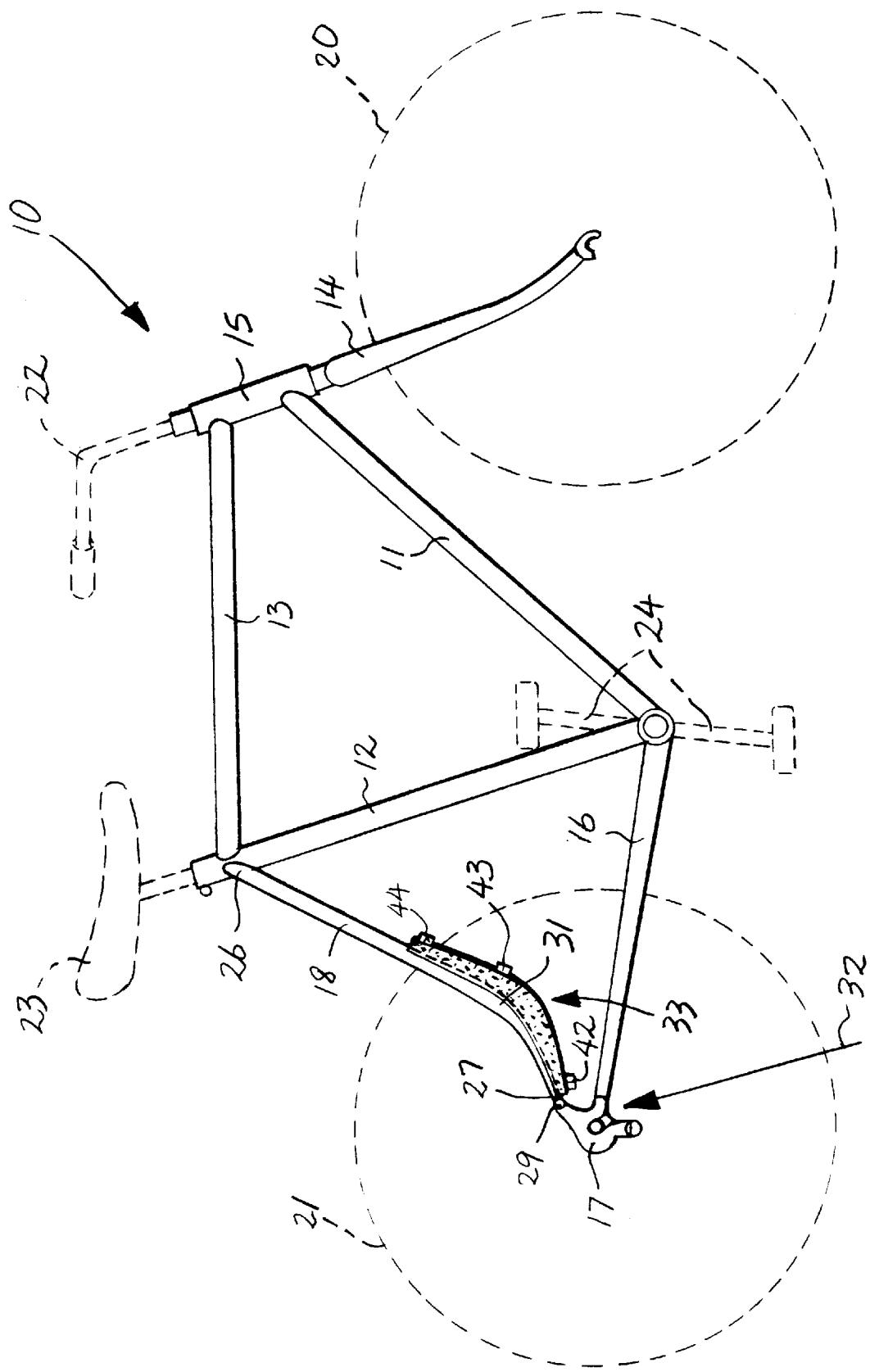
FIG. 1 is a side view of an exemplary bicycle frame according to the invention, showing various other conventional components of a bicycle in dotted line in association therewith.

An exemplary bicycle frame according to the present invention is shown schematically and generally at reference numeral 10 in FIG. 1. The conventional components of the frame 10 include the downtube 11, the seat tube 12, the cross bar 13, the fork 14, the head tube 15, a pair of chain stays (only one of which is seen) 16, and a rear drop-out 17. As is conventional, the chain stays 16 are operatively connected to the drop-out 17 and to the seat tube 12, the cross bar 13 is operatively connected between the seat tube 12 and the head tube 15, the downtube 11 is operatively connected between the seat tube 12 and the head tube 15, and the fork 14 is operatively connected to the head tube 15. As is also conventional the frame 10 also includes a pair of seat stays 18 (only one of which is seen in FIG. 1), but the seat stays 18 are unique according to the invention.

The frame 10 of course is designed to be used with other conventional bicycle components, such as—as seen in dotted line in FIG. 1 and having a wide variety of conventional configurations—a front wheel 20, rear wheel 21, handle bars 22, seat 23, pedals 24, and like structures not shown such as a sprocket, chain, gears, derailleur, brakes, and associated handles, controls, and cables.

Figure 2:
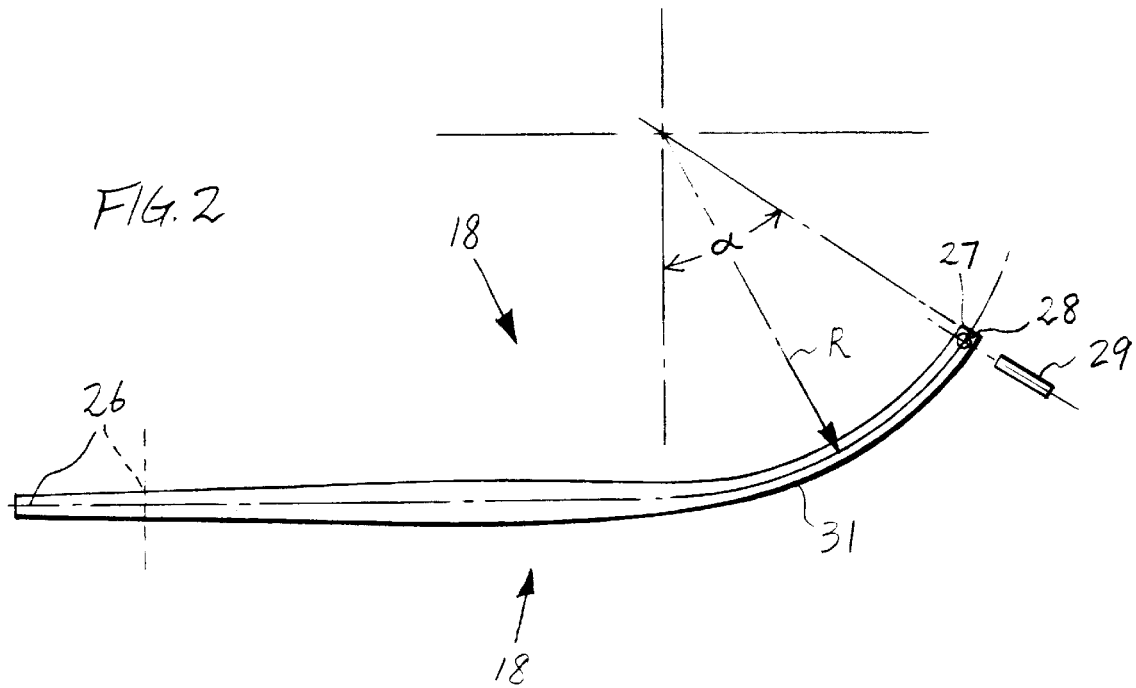
FIG. 2 is a side view of an exemplary seat stay of the frame of FIG. 1 showing the radius and arcuate extent of the portion thereof connected to the rear drop-out, and showing, schematically, the adjustability of the length thereof.
Figure 3:
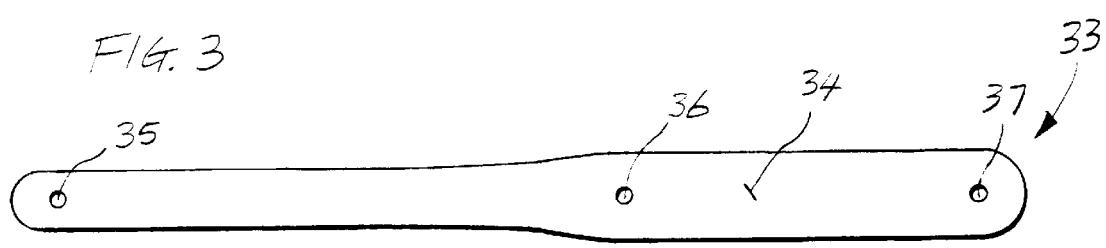
FIGS. 3 through 5 are bottom, side, and top views, respectively, of an exemplary combination damping and spring force-providing element according to the invention, used with the bicycle frame of the invention of FIG. 1 and particularly in association with the seat stay of FIG. 2.

The unique seat stay 18 according to the present invention is seen per se in FIG. 2, and has a first end 26 which is operatively connected to the seat tube 12 in a conventional manner, and a second, lower, end 27 which is connected to the drop-out 17. While the end 27 may be connected to the drop-out 17 in a conventional manner, preferably according to the invention a pivotal connection is provided between the second end 27 and the drop-out 17. For example that pivotal connection may be provided by a pivot pin receiving opening 28 (see FIG. 2) adjacent the second end 27 which receives a pivot pin 29, shown schematically in FIG. 2, which is also received within a corresponding opening (not shown) in the drop-out 17. The pivot pin 29, or like other conventional pivoting structure, allows pivotal action of the seat stay 18 about an axis generally transverse to the dimension of elongation of the chain stays 16, which axis of rotation is also substantially parallel to the axis of rotation of the rear wheel 21.

As seen in FIG. 2, the stay 18 is preferably curved to provide an arcuate portion 31 adjacent the second end 27. The arcuate portion 31 preferably is a circular arc, although other and complex curvatures may be provided for certain circumstances. The seat stay 18, before bending and cutting off at the end 26 to fit different size frames, may have a length of about 22–23 inches. As seen in FIG. 2 the arc 31 has a radius R and subtends an angle $\alpha$. In the preferred embodiment the radius R is slightly over thirteen inches (e.g. about 13.125 inches), although it can be within the range of about 12–14 inches, and even within the wider range of about 11–16 inches. The angle $\alpha$ is preferably about 45 degrees, although it can be within the range of about 40–50 degrees, and even within the broader range of about 20–60 degrees. The length of the stay 18 is cut to accommodate different sized frames, for example being cut at the dotted line also indicated at 26 in FIG. 2.

Figure 6:
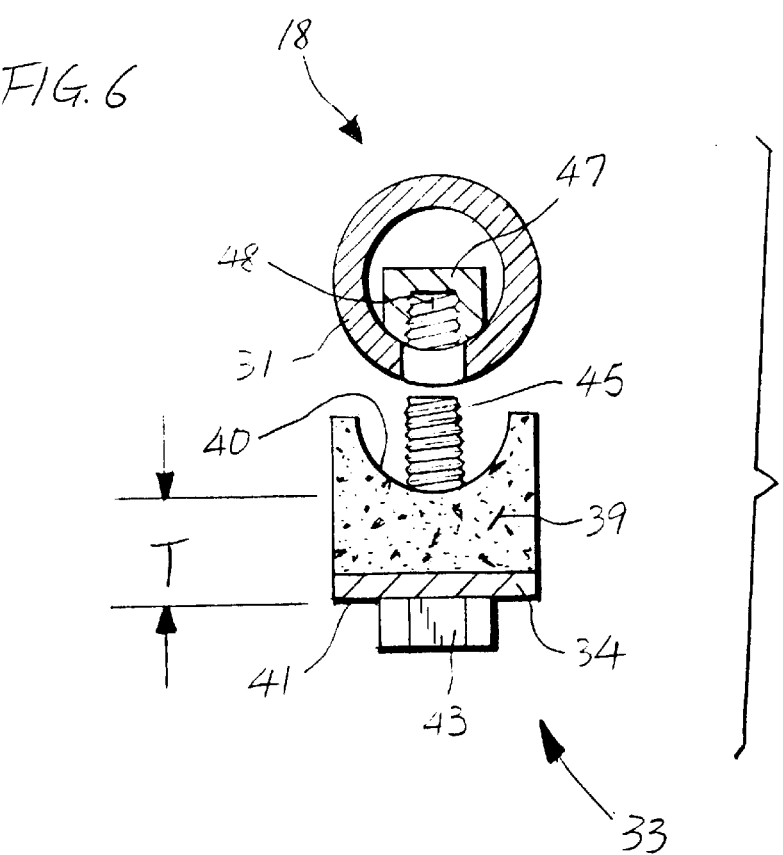
FIG. 6 is an end cross-sectional view, partly in elevation, showing the manner of interconnection between the combination element of FIGS. 3 through 5 with the seat stay of FIG. 2.

The stay 18 is preferably tubular and has a generally circular cross-section, but tapers too. FIG. 6 shows a generally circular cross-section of the stay 18 at the arcuate portion 31. While a wide variety of constructions may be provided, the seat stay 18 may have both ends 26, 27 swaged with a seat stay die, a central portion with an outside diameter of about three-quarters of an inch and a wall thickness of between about 0.027–0.035 inches and tapering from the central portion toward the ends 26, 27. Other dimensions or configurations can be used, however, depending upon the particular configuration of the rest of the frame 10 components, the expected specific use of the frame 10, and other factors.

As schematically illustrated in FIG. 1, the seat stays 18 are curved, positioned, and dimensioned so as to act as a spring when the rear wheel 21, and drop-out 17, are subjected to bump forces, such as illustrated schematically by the arrow 32 in FIG. 1.

Also according to the present invention there is provided a combination damping and spring force-providing element, shown schematically at 33 in FIGS. 1 and 3 through 6. The combination element 33 also comprises means for substantially simultaneously increasing the spring constant of at least one of the seat stays 18 (and preferably both), while damping spring action thereof, when the rear drop-out 17 is subjected to bump forces. While other means could be provided, such as conventional types of shock absorbers mounted between the stay 18 convex arcuate curvature portion 31, and other frame components (such as the chain stays 16 and/or seat tube 12), preferably the means take the form of the structure 33 illustrated in FIGS. 1 and 3 through 6.

The structure 33 comprises a non-elastomeric material, but preferably flexible, support 34, which preferably is a strip of sheet metal, such as sheet steel, preferably stainless steel. While different mounting mechanisms may be provided, preferably the support 34 has a plurality (e.g. three) of bolt or other fastener-receiving openings 35–37 therein, as seen most clearly in FIGS. 3 and 5.

Figure 4:
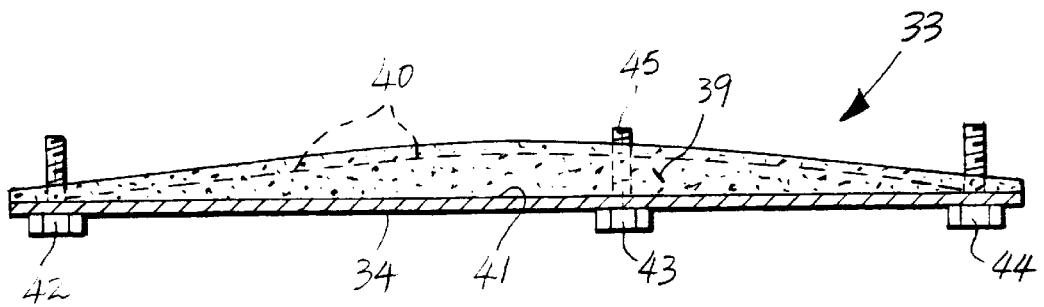
Figure 5:
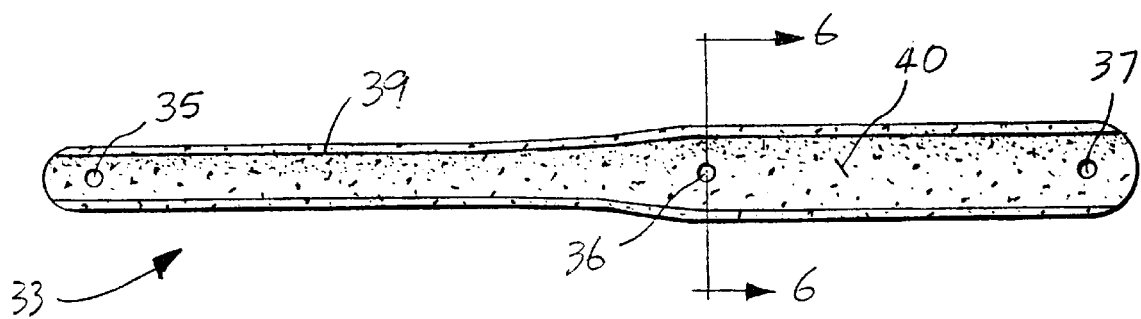

Engaging, and preferably bonded to (such as by using any conventional suitable adhesive), the support 34 is an elastomeric material portion 39 having a first surface 40 and a second surface 41 (see FIGS. 4 through 6 in particular). The surface 41 may be substantially planar, or otherwise have the same configuration as the support 34, as seen most clearly in FIG. 6, while the first surface 40—as again seen most clearly in FIG. 6—is contoured to correspond to the contour of the stay 18 so that the elastomeric material 39 partially envelopes the convex portion 31 of the stay 18. The surface 41 will be contoured and dimensioned so that it substantially exactly corresponds to the convex arcuate portion 31 of the stay 18, including any change in diameter or taper that it may have, over a significant portion of the length thereof. For example the element 33 may have a length between about 11–12 inches. which is enough to cover the entire arcuate extent of the portion 31, as well as a part of the straight portion of the seat stay 18, as illustrated schematically in FIG. 1.

The elastomeric material 39 has openings 35–37 therein corresponding to the openings 35–37 in the support 34. While the material 39 may be made from a wide variety of elastomeric materials, one preferred material is silicone. Preferably the durometer of the elastomeric material 39 is between about 20 70 Shore A. As a matter of fact a number of different elements 33, with different durometers (the durometers differing from each other by at least about 5 (e.g. at least about 10) Shore A units for the elements 33 within a set) are preferably used so as to provide ready adjustability of the spring force increasing and damping functions of the elastomeric material 39. At its thickness point—substantially where illustrated in FIG. 6—the silicone 39 has a thickness T of about 0.45 inches. The thickness tapers to close to zero at the ends adjacent the openings 35, 37.

The preferred manner of attachment of the element 33 to the stay 18 is by using a plurality of bolts 42–44, or like fasteners, each having a threaded shank 45. FIG. 6 schematically illustrates how the shank 45 cooperates with the stay 18, preferably threading into an insert 47, having internal threads 48, which is welded or otherwise attached to the metal (preferably steel) forming the stay 18. Of course other fastening mechanisms that are conventional may be provided instead of the inserts 47, or the bolts 42–44 may actually have their shanks pass entirely through the stay 18 being connected by nuts at the other side, although that is less desirable for the purposes of maintaining the integrity and desired properties of the stay 18.

While it is possible to provide only one of the elements 33 attached to one stay 18, by far the most desirable results are obtained where elements 33 are attached to both stays 18, and the elements 33 attached to those stays have elastomeric material 39 of substantially the same durometer. However when it is desired to change the spring force or damping effect of the elements 33, that may be readily accomplished simply by undoing the bolts 42–44 on each of the stays 18 and putting the new element 33 in place.

In use of the elements 33 associated with the stays 18, when the rider hits a bump with the rear wheel 21, the bump force 32 pushes up on the rear wheel 21, and the rear drop-out 17, as schematically illustrated in FIG. 1. This flexes the seat stays 18, tightening the curved portions 31 thereof. As the curves of the curved portions 31 are tightened, the silicone 39 is compressed between the stay 18 and the support 34. The silicone 39 resists compression, and thereby increases the spring rate of the seat stay 18, and provides a damping effect. The bending of the seat stay 18, and the provision of the elements 33, are relatively simple and inexpensive, and do not add much weight to the frame 10, thereby effectively absorbing high frequency, low amplitude vibration, with a minimum of cost, trouble, and weight, and allowing ready adjustability of the spring constant and damping effect depending upon rider weight, riding style, road or terrain conditions, and the like.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A bicycle frame comprising a downtube, a seat tube, a cross bar, a fork, a head tube, a pair of chain stays, a rear drop-out, and a pair of seat stays, said chain stays operatively connected to said drop-out and to said seat tube, said cross bar operatively connected between said seat tube and said head tube, said downtube operatively connected between said seat tube and said head tube, and said fork operatively connected to said head tube;

said seat stays each having a first end operatively connected to said seat tube, and a second end pivotally connected to said rear drop-out for pivotal movement about an axis substantially perpendicular to the dimension of elongation of said chain stays; and a combination damping and spring force-providing element mounted to each of said seat stays which provides a spring force resisting pivotal movement of said seat stays about said axis, and providing damping thereof, said combination element comprising an elastomeric material connected between said seat stay at a portion thereof between said first and second ends thereof facing said chain stay, and a non-elastomeric material support.

2. A bicycle frame as recited in claim 1 wherein said non-elastomeric material support is releasably connected to said seat stay so that another combination element with a different effective damping and spring constant may be readily substituted therefor.

3. A bicycle frame as recited in claim 1 wherein said combination element comprises an elastomeric material comprising silicone having a durometer between about 20–70 Shore A.

4. A bicycle frame comprising a downtube, a seat tube, a cross bar, a fork, a head tube, a pair of chain stays, a rear drop-out, and a pair of seat stays, said chain stays operatively connected to said drop-out and to said seat tube, said cross bar operatively connected between said seat tube and said head tube, said downtube operatively connected between said seat tube and said head tube, and said fork operatively connected to said head tube;

said seat stays each having a first end operatively connected to said seat tube, and a second end operatively connected to said rear drop-out;

said seat stays also each comprising an arcuate portion thereof closer to said second end than said first end, and convex with respect to said chain stays;

said seat stays being curved, positioned, and dimensioned so as to act as a spring if said rear drop-out of said bicycle frame is subjected to bump forces; and means for substantially simultaneously increasing the spring constant of at least one of said seat stays while damping spring action thereof, when said rear drop-out is subjected to bump forces.

5. A bicycle frame as recited in claim 4 wherein said simultaneous means comprises an elastomeric material connected between said seat stay at said convex arcuate portion thereof, and a non-elastomeric material, but flexible, support.

6. A bicycle frame as recited in claim 5 wherein said non-elastomeric support is releasably connected to said seat stay so that another simultaneous means with a different effective damping and spring constant may be readily substituted therefor.

7. A bicycle frame as recited in claim 5 wherein said elastomeric material comprises silicone having a durometer between about 20–70 Shore A.

8. A bicycle frame as recited in claim 7 wherein said non-elastomeric support comprises a strip of stainless steel.

9. A bicycle frame as recited in claim 5 wherein said second end of each of said seat stays is pivotally connected to said rear drop-out for pivotal movement about an axis substantially transverse to the dimension of elongation of said chain stays.

10. A bicycle frame as recited in claim 5 wherein said seat stay is tubular, having a substantially circular cross-section at and adjacent said arcuate portion; and wherein said elastomeric material has a surface having a contour comparable to said substantially circular cross-section of said seat stay which engages and partially surrounds said seat stay.

11. A bicycle frame as recited in claim 10 wherein said seat stay arcuate portion is tapered, and wherein said elastomeric material surface has a configuration corresponding to said taper; and wherein said non-elastomeric support is attached to said seat stay by a plurality of threaded fasteners passing through said support and elastomeric material and received by a threaded insert in said stay.

12. A bicycle frame comprising a downtube, a seat tube, a cross bar, a fork, a head tube, a pair of chain stays, a rear drop-out, and a pair of seat stays, said chain stays operatively connected to said drop-out and to said seat tube, said cross bar operatively connected between said seat tube and said head tube, said downtube operatively connected between said seat tube and said head tube, and said fork operatively connected to said head tube;

said seat stays each having a first end operatively connected to said seat tube, and a second end operatively pivotally connected to said rear drop-out for pivotal movement about an axis substantially transverse to the dimension of elongation of said chain stays;

said seat stays also each comprising an arcuate portion thereof closer to said second end than said first end, and convex with respect to said chain stays;

said seat stays being curved, positioned, and dimensioned so as to act as a spring if said rear drop-out of said bicycle frame is subjected to bump forces; and connected to said convex arcuate portion of each seat stay, a non-elastomeric material strip supporting an elastomeric material, said elastomeric material held in contact with said arcuate portion of said seat stay.

13. A bicycle frame as recited in claim 12 wherein said elastomeric material has a durometer between about 20–70 Shore A, and wherein said non-elastomeric material strip is a metal strip.

14. A bicycle frame as recited in claim 13 wherein said circular arcuate portion has a radius of between about 12–14 inches and subtends an angle of between about 40–50 degrees.

* * * * *